(12) United States Patent
Miki et al.

(10) Patent No.: US 6,235,374 B1
(45) Date of Patent: May 22, 2001

(54) POLYESTER FILM FOR DECORATIVE SHEET

(75) Inventors: Takatoshi Miki; Kenji Yoshihara, both of Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/233,351

(22) Filed: Jan. 19, 1999

(30) Foreign Application Priority Data

Jan. 20, 1998 (JP) .................................................. 10-022804
Feb. 10, 1998 (JP) .................................................. 10-044418

(51) Int. Cl.$^7$ .......................... B32B 27/06; B32B 27/08; B32B 27/20; B32B 27/36
(52) U.S. Cl. .......................... 428/201; 428/195; 428/203; 428/204; 428/212; 428/213; 428/215; 428/216; 428/480; 428/483; 428/413; 428/423.7
(58) Field of Search ...................................... 428/195, 201, 428/203, 204, 480, 212, 213, 215, 216, 483, 413, 423.7

(56) References Cited

U.S. PATENT DOCUMENTS

| 5,554,657 | * | 9/1996 | Brownscombe et al. ............... 521/48 |
| 5,932,320 | * | 8/1999 | Okajima et al. ...................... 428/195 |
| 5,976,676 | * | 11/1999 | Miki et al. ............................ 428/201 |

FOREIGN PATENT DOCUMENTS

| 196 30 817 A1 | 2/1998 | (DE) . |
| 0 312 305 A1 | 4/1989 | (EP) . |
| 0 783 962 A2 | 7/1997 | (EP) . |
| 0 795 399 A1 | 9/1997 | (EP) . |
| 0 839 856 A2 | 5/1998 | (EP) . |
| 0 873 864 A2 | 10/1998 | (EP) . |
| 08085193 | 4/1996 | (JP) . |
| 08108458 | 4/1996 | (JP) . |

* cited by examiner

*Primary Examiner*—Vivian Chen
(74) *Attorney, Agent, or Firm*—David G. Conlin; Dike, Bronstein, Roberts & Cushman

(57) ABSTRACT

The present invention relates to a polyester film for a decorative sheet wherein said sheet comprises a picture-printed layer (B) and said polyester film (A) laminated on a substrate, said polyester film containing a color pigment in an amount of 0.1 to 30 weight % based on the weight of said polyester (A), and said polyester film having a color tone which satisfies the color difference $\Delta E^*$ between said polyester film (A) and the picture-printed layer (B), which is represented by the following formula (1), of not more than 50.

$$\Delta E^* = \{(L^*A - L^*B)^2 + (a^*A - a^*B)^2 + (b^*A - b^*B)^2\}^{1/2} \quad (1)$$

wherein $L^*A$, $a^*A$ and $b^*A$ represent color tone values of the polyester film (A) in CIELAB color determination system; and $L^*B$, $a^*B$ and $b^*B$ represent color tone values of the picture-printed layer (B) in CIELAB color determination system.

11 Claims, No Drawings

POLYESTER FILM FOR DECORATIVE SHEET

BACKGROUND OF THE INVENTION

The present invention relates to a polyester film for decorative sheets. The decorative sheet used herein generally means a decorative material (surface material) attached to the surface of a substrate for various products such as furnitures, building components or household appliances and provided on a surface thereof with a picture-printed layer. Whereas, the decorative plate used herein generally means a building material (surface material) comprising at least a film layer and a picture-printed layer which are successively laminated on the surface of a substrate, and usually dealt as an independent commercial product. Accordingly, the film layer and the picture-printed layer laminated on the surface of the substrate of the decorative plate are constituents of the decorative sheet.

As a sheet material (film) interposed between the substrate and the picture-printed layer of the decorative plate or used in the decorative sheet, polyvinylchloride resin sheets have been most generally used. However, in the case where the polyvinylchloride resin sheet is used, there arise such problems that a plasticizer blended in the sheet is migrated to an adjacent adhesive layer, resulting in deteriorated adhesion between the sheet and a substrate, and that the polyvinylchloride resin sheet suffers from elongation or shrinkage upon heating due to low thermal dimensional stability thereof, thereby causing wrinkles thereon. Further, it has been reported that the polyvinylchloride sheet generates a chlorine gas upon burning, thereby causing sources of acid rain or dioxin. In consequence, it has been strongly demanded that decorative plates or decorative sheets should be produced without using the polyvinylchloride resin sheet from a standpoint of environmental protection.

On the other hand, since the decorative plates and the decorative sheets are used as a surface material, picture patterns having a high design value are usually formed on a surface thereof. Therefore, it is extremely important to control color tones of the decorative plate or the decorative sheets in order to obtain appropriate contrasts between the picture patterns or delicate contrasts of shade and shadow thereon.

Meanwhile, since the decorative plates and the decorative sheets are used as surface materials, it is inevitable that these plates and sheets come into contact with tip ends of cleaners, fingernails or toenails, etc., so that the surfaces thereof sometimes become damaged. Especially when the surfaces of the decorative plates or the decorative sheets undergo severe contact, scratch or abrasion, much larger damages are caused thereon, so that a surface or an inside of a underlying film layer tends to be exposed to the surfaces of the decorative plates or the decorative sheets. In such a case, when a color tone of the film layer is different from that of a printed layer provided on the surface of the film layer, the damaged portions are remarkably contrasted with surrounding portions due to the difference in color tone therebetween, thereby causing severe damage to a design value of the surfaces of the decorative plates or the decorative sheets.

Also, in the production of polyester films, there have been caused film scraps trimmed or separated off, e.g., from edge portions of biaxially-stretched films because these edge portions are unsuitable as commercial products. The film scraps are formed into pellets and then re-used as reclaimed polyester. The blending percentage of the reclaimed polyester to virgin polyester is about 3 to about 70% by weight though it is varied depending upon types of films to be produced or an aimed production efficiency. Accordingly, in the case where the above-mentioned reclaimed polyester is used for the production of polyester films, it becomes possible to obtain inexpensive decorative plates or decorative sheets using the polyester film as an alternate material of polyvinylchloride.

However, the reclaimed polyester obtained from the production process of color pigment-containing polyester films which are used as films for decorative plates or decorative sheets, suffers from considerable change in color tone during reclaiming process therefor before being formed into pellets. Therefore, when such a reclaimed polyester is mixed with virgin polyester, the color tone of the resultant polyester film is affected in a large extent.

As a result of the present inventors' earnest studies, it has been found that in use for a decorative sheet comprising at least a picture-printed layer and a film layer which will be successively laminated on a substrate thereof, by adjusting a color difference between the film layer and the picture-printed layer to a specified value, or by constituting the film layer from at least one layer and at least one other layer and adjusting a color difference between the layer and the other layer to a specified value, the above problems can be solved. The present invention has been attained by the above findings.

SUMMARY OF THE INVENTION

It is an object of the present invention to provide a polyester film for decorative sheets which can maintain a high design value even when a picture-printed layer thereof suffers from dents or scratches.

It is another object of the present invention to provide a color pigment-containing polyester film for decorative sheets which can reduce costs of raw materials by blending a reclaimed raw material therein, and can maintain a constant color tone even when such a reclaimed raw material is blended.

To accomplish the aims, in the first aspect of the present invention, there is provided a polyester film for a decorative sheet which sheet comprises a picture-printed layer (B) and the said polyester film (A) laminated on a substrate, the said polyester film containing a color pigment in an amount of 0.1 to 30 weight % based on the weight of the said polyester (A), and the said polyester film having a color tone which satisfies the color difference $\Delta E^*$ between the said polyester film (A) and the picture-printed layer (B), which is represented by the following formula (1), of not more than 50.

$$\Delta E^* = \{(L^*A - L^*B)^2 + (a^*A - a^*B)^2 + (b^*A - b^*B)^2\}^{1/2} \quad (1)$$

wherein $L^*A$, $a^*A$ and $b^*A$ represent color tone values of the polyester film (A) in CIELAB color determination system; and $L^*B$, $a^*B$ and $b^*B$ represent color tone values of the picture-printed layer (B) in CIELAB color determination system.

In the second aspect of the present invention, there is provided a polyester film for a decorative sheet which sheet comprises a picture-printed layer (B) and the said polyester film laminated on a substrate, which polyester film comprises at least one film layer (A1) and at least one film layer (A2) and is produced by a co-extrusion method, the said at least one film layer (A1) and the said at least one film layer (A2) satisfying the following requirements (i) and (ii):

(i) the said at least one film layer (A1) comprising polyester containing virgin polyester in an amount of not less than 90% by weight, whereas the said at least one film layer (A2) comprising 10 to 70% by weight of reclaimed polyester obtained from a color pigment-containing polyester and 30 to 90% by weight of virgin polyester; and (ii) the color difference ΔE' between the said at least one film layer (A1) and the said at least one film layer (A2), which is represented by the following formula (3), being not more than 5.0.

$$\Delta E' = \{(Lm-Ls)^2 + (am-as)^2 + (bm-bs)^2\}^{1/2} \quad (3)$$

wherein Ls, as and bs represent color tone values of the film layer (A1) in Hunter's color determination system; and Lm, am and bm represent color tone values of the film layer (A2) in Hunter's color determination system.

DETAILED DESCRIPTION OF THE INVENTION

The present invention is explained in detail below. The term of "polyesters" used herein means ester group-containing polyesters which are produced by the polycondensation of dicarboxylic acid with diol or hydroxycarboxylic acid.

Examples of the dicarboxylic acids may include telephthalic acid, isophthalic acid, adipic acid, azelaic acid, sebacic acid, 2,6-naphthalene-dicarboxylic acid, 1,4-cyclohexane-dicarboxylic acid or the like. Examples of the diols may include ethylene glycol, 1,4-butane-diol, diethylene glycol, triethylene glycol, neopentyl glycol, 1,4-cyclohexane-dimethanol, polyethylene glycol or the like. Examples of the hydroxycarboxylic acids may include p-hydroxy-benzoic acid, 6-hydroxy-2-naphthoic acid or the like.

Typical examples of the polyesters may include polyethylene telephthalate, polyethylene-2,6-naphthalate or the like. The polyesters used in the present invention may be in the form of homopolymers or copolymers prepared by copolymerizing a third component therewith.

First, the polyester film according to the first aspect of the present invention is explained. The polyester film according to the first aspect of the present invention, has a color tone similar to that of the picture-printed layer formed on the surface thereof and contains a color pigment in an amount of 0.1 to 30 weight % based on the weight of the said polyester (A). More specifically, it is required that the color difference ΔE* between the polyester film (A) and the picture-printed layer (B) which is represented by the following formula (1), is not more than 50.

$$\Delta E^* = \{(L^*A - L^*B)^2 + (a^*A - a^*B)^2 + (b^*A - b^*B)^2\}^{1/2} \quad (1)$$

wherein L*A, a*A and b*A represent color tone values of the polyester film (A) in Lab color system; and L*B, a*B and b*B represent color tone values of the picture-printed layer (B) in Lab color system.

In accordance with the present invention, the color difference ΔE* is preferably not more than 45, more preferably not more than 40. When the color difference ΔE* is more than 50, the color tone of the picture-printed layer may be considerably different from that of the polyester film, thereby failing to accomplish the aims of the present invention.

Meanwhile, when various furnitures, doors, etc., are processed in order to impart decorations to the surfaces thereof, end portions of decorative plates or decorative sheets used therefor are occasionally located at such positions noticed from outside. Even in such a case, the polyester film according to the present invention which has a color tone similar to that of the picture-printed layer, can be preferably used without any damage to a high design value of the picture-printed layer.

Further, wood-based materials have been favorably used for furniture, building materials, household appliances or the like. Specifically, ligneous color tones are favorably adopted in Japanese-style housings, because a space surrounded by such ligneous color tones contributes to mental rest. In such a case, since the picture-printed layer has a yellowish color tone, it is important to control the b* value thereof. Accordingly, it is preferred that the relationship between the b* value of the polyester film (A) according to the present invention and that of the picture-printed layer (B) satisfies the following formula (2):

$$|b^*A - b^*B| \leq 20 \quad (2)$$

wherein b*A represents the b* value of the polyester film (A); and b*B represents the b* value of the picture-printed layer (B).

Namely, the difference (as absolute value) between the b* value of the polyester film (A) according to the present invention and that of the picture-printed layer (B) is preferably not more than 20, more preferably not more than 15.

The above-mentioned color tone or hue (L*, a*, b*) of the polyester film according to the present invention may be measured by a color difference meter, and can be controlled by blending pigments therein taking into consideration a hiding power thereof. Accordingly, it is preferred that the polyester film according to the present invention contains color pigments. Further, the polyester film according to the present invention have preferably a color tone expressed by L*A value of 20 to 80, a*A value of not less than −10 and b*A value of not less than −5 because of the following reason.

As described above, wood-based materials have been favorably used for furnitures, building materials, household appliances or the like. Since the wood-based materials basically have a yellowish color tone, it becomes important to control the b* value thereof. Further, when the respective color tone values of the polyester film are adjusted to the above-specified ranges, it is possible to realize a color tone of wood-based material having a still higher design value. In other words, when the respective color tone values of the polyester film are out of the specified ranges, the film shows a color tone different from that of the wood-based material, so that it becomes difficult to control the color tone of the picture-printed layer formed on the polyester film. Besides, as described above, in the case where an end surface of the decorative plate is exposed to such portions visible from outside, since the color tone of the polyester film is different from the wood-like color tone of the picture-printed layer, the design value of the picture-printed layer is considerably damaged.

As the pigments, there may be exemplified titanium dioxide particles, barium sulfate particles, calcium carbonate particles, carbon black particles or the like. From the standpoints of dispersibility in polyester and weather resistance of the decorative plate or decorative sheet, these pigments may be surface-treated with oxides of aluminum, silicon or zinc, or the like. In addition, as other inorganic pigments used in the present invention, there may be exemplified zinc white, white lead, red iron oxide, cadmium red, chrome yellow, cobalt blue, cobalt violet, zinc chromate or the like. These pigments may be used in the form of a mixture of any two or more thereof. In this case, it is preferred that the mixture contains at least titanium dioxide in view of the hiding power of the film.

Further, in the polyester film according to the present invention, the use of yellow pigments comprising iron oxide and zinc oxide is preferred. The reason therefor is described hereinafter.

As inorganic yellow pigments, there may be usually exemplified chrome yellow, cadmium yellow, zinc chromate or the like. As organic yellow pigments, there may be usually exemplified anthraquinone-based pigments. However, these yellow pigments tend to be discolored and deteriorated in yellow tinting strength by the heat applied upon production of the polyester film. On the other hand, the yellow pigment comprising iron oxide and zinc oxide can show an excellent heat resistance and, therefore, can maintain a sufficient yellow tinting strength even upon heating.

The yellow pigment comprising iron oxide and zinc oxide is preferably a calcined pigment produced by calcining a mixture comprising iron oxide (red) and zinc oxide (white) at a weight ratio of 1:4 to 4:1 (iron oxide:zinc oxide). When the weight ratio of iron oxide to zinc oxide in the calcined pigment is out of the above-specified range, the yellow tinting strength may be lowered, so that it becomes difficult to obtain the aimed color tone. The weight ratio of iron oxide to zinc oxide is preferably 1:3 to 3:1.

In addition, the primary particle size of the calcined pigments is preferably not more than 5.0 $\mu$m. When the primary particle size is more than 5.0 $\mu$m, the yellow tinting strength of the calcined pigments becomes poor, and there is a tendency that falling-off of the pigments is caused upon the film formation. The primary particle size of the calcined pigments is more preferably 0.01 to 4.0 $\mu$m. Further, it is preferred that the calcination of iron oxide and zinc oxide is conducted at a temperature of not less than 700° C. using a tunnel-type kiln.

The average particle size of the pigments is usually not more than 5.0 $\mu$m, preferably 0.01 to 4.0 $\mu$m. When the average particle size of the pigments is more than 5.0 $\mu$m, the surface of the polyester film may become too rough, so that the printed surface is deteriorated in quality thereof or the pigments tend to be fallen off from the surface of the polyester film.

The amount of the pigments contained in the polyester film is 0.1 to 30% by weight, preferably 1 to 20% by weight based on the weight of the said polyester (A). When the amount of the pigments is less than 0.1% by weight, the hiding power of the polyester film as a whole may be reduced, thereby failing to exhibit an inherent color tone of the pigments. On the other hand, when the amount of the pigments is more than 30% by weight, the pigments may be agglomerated in the film, thereby forming coarse protrusions on the surface of the film or deteriorating a mechanical strength of the film. Incidentally, in the polyester film according to the present invention, organic pigments may also be used. As the organic pigments, there may be exemplified phthalocyanine-based pigments, dioxazine-based pigments, anthraquinone-based pigments or the like.

In the present invention, the pigments may be added during the polymerization reaction of polyester. Alternatively, after the polymerization of polyester, the pigments may be kneaded with and dispersed in the polyester, e.g., by using a twin-screw extruder to form a master batch, and then a predetermined amount of the master batch may be blended in the polyester film. As the method of controlling the content of the pigments in the polyester film, there may be effectively used a method of preparing a master raw material and diluting the master raw material with a virgin material containing substantially no pigments. Incidentally, the pigments may be preliminarily subjected to various treatments such as crushing, dispersion, classification, filtration or the like, if necessary.

In order to enhance the adhesion between the polyester film and the picture-printed layer, it is preferable to form a coating layer on at least one polyester film surface to be contact with the picture-printed layer (B). As coating materials for forming the coating layer, there may be optionally used known coating materials. From the standpoint of the adhesion between the polyester film and the picture-printed layer, it is preferred that the coating materials are comprising at least one compound selected from the group consisting of polyester resins, acrylic resins, polyurethane resins, amino resins, epoxy resins, oxazoline resins and coupling agents.

The thickness of the coating layer after drying is usually 0.001 to 10 $\mu$m, preferably 0.010 to 5 $\mu$m, more preferably 0.015 to 2 $\mu$m. When the thickness of the coating layer is less than 0.001 $\mu$m, the adhesion between the polyester film and the picture-printed layer may become insufficient, so that even though ink having a good adhesion property to the polyester film is used in the picture-printed layer, the effect may not be sufficiently exhibited. On the other hand, when the thickness of the coating layer is more than 10 $\mu$m, since the coating layer tend to act as adhesive, adjacent overlapped portions of the film rolled up readily adhere to each other, i.e., so-called blocking phenomenon may be likely to occur. Further, the color tone of the coating layer adversely may affect color tones of surrounding portions, so that not only the inherent color tone of the polyester film but also that of the picture-printed layer may not be appropriately exhibited, resulting in damage to the design value of the decorative sheet.

The coating layer is preferably formed by a so-called in-line coating method in which a coating solution is applied on a polyester film during the film-production process by known methods.

As described above, the decorative sheet may be used as a surface material of furnitures, household appliances or the like. Conventionally, many of furnitures or household appliances (such as doors) are constituted by flat surfaces. However, in recent years, curved surfaces tend to be adopted or incorporated in these goods due to change in favorable appearance or design. That is, the use of wood materials having a curved surface is considered to be worthy, because they can contributes to mental rest, so that such a curved shape is now favorably adopted in furnitures or household appliances. In order to satisfy these demands, it has been required that decorative sheets used in these furnitures or household appliances are readily deformable so as to fit to curved shapes thereof.

Among constituents of the decorative sheet, the thickest element is the polyester film. Accordingly, from the viewpoint of improving a deformability of the decorative sheet, it is necessary to enhance a deformability of the polyester film. In order to meet these requirements, it is preferred that the polyester film according to the present invention is a copolymerized polyester film which contains at least isophthalic acid units as a dicarboxylic acid component in an amount of 5 to 30 mol % based on the total dicarboxylic acid. When the content of the isophthalic acid units is less than 5 mol %, the obtained copolymerized polyester film may exhibit a poor deformability. On the other hand, when the content of the isophthalic acid units is more than 30 mol %, the obtained film may be deteriorated in thermal dimensional stability, so that heat wrinkles or blisters tend to be caused upon printing, etc.

The picture-printed layer formed on the surface of the polyester film according to the present invention may comprising a single layer or multiple layers. In general, in order to exhibit a high design value, the picture-printed layer may be obtained by a multi-layer-printing method of overlappedly printing various picture patterns on an undercoat layer formed on the polyester film. The finally finished picture-printed layer can have various picture patterns having a high design value, such as wood grain-like pattern, ceramic wall-like pattern, stone-like pattern, or other picture patterns using primary colors such as red, yellow, blue or the like.

In the polyester film according to the first aspect of the present invention, reclaimed materials such as trimmed film edges discharged after stretching in transverse direction in the production process may be blended into the starting material. Further, the polyester film may comprise tow or more polyester layers, as far as the color tone of the polyester film is adjusted within the above limitation.

Second, the polyester film according to the second aspect of the present invention is explained.

The polyester film according to the second aspect of the present invention i s preferably a color pigment-containing laminated polyester film for decorative sheets which can be produced by a co-extrusion method and can satisfy the following requirements (i) and (ii).

(i) The color difference ΔE between at least one film layer (A1) and at least one film layer (A2) which is represented by the following formula (3) is not more than 5.0.

$$\Delta E' = \{(Lm-Ls)^2 + (am-as)^2 + (bm-bs)^2\}^{1/2} \qquad (3)$$

wherein Ls, as and bs represent color tone values of the film layer (A1) in Hunter's color determination system; and Lm, am and bm represent color tone values of the film layer (A2) in Hunter's color determination system.

(ii) The film layer (A1) comprises polyester containing virgin polyester in an amount of not less than 90% by weight, whereas the film layer (A2) comprises polyester containing reclaimed polyester obtained from the color pigment-containing polyester in an amount of 10 to 70% by weight and virgin polyester in an amount of 30 to 90% by weight.

As the pigments used in the color pigment-containing polyester films according to the second aspect, there may be used the same pigments as defined in the first aspect described hereinbefore.

In the present invention, organic pigments may also be used in the color pigment-containing polyester films. As the organic pigments, there may be exemplified phthalocyanine-based pigments, dioxazine-based pigments, anthraquinone-based pigments or the like. In general, organic pigments have such a problem that organic components thereof are sublimated or thermally decomposed during film production process, especially during reclaiming process, thereby causing unsuitable change in color tone thereof. However, in accordance with the present invention, by restricting an amount of the reclaimed raw material blended in the film layer, it is possible to effectively prevent occurrence of the change in color tone of the laminated film as a whole, so that the polyester film according to the present invention can be preferably applied to decorative plates or decorative sheets requiring a high design value.

The average particle size of the pigments and the amount of the pigments used in the color pigment-containing polyester films is the same definition as described in the first aspect hereinbefore.

In the method of addition of the pigments and the treatment method for the pigments, the same methods as defined in the first aspect described hereinbefore can be used.

In the present invention, in view of advantages such as low costs of raw materials or environmental protection by decreasing an amount of film scraps to be treated which are discharged from film production process or the like, a mixture comprising reclaimed polyester and virgin polyester may be used as a raw polyester. As the reclaimed polyester, there may be used trimmed film edges or the like discharged from the production process of color pigment-containing polyester films.

The layer structure of the color pigment-containing laminated polyester film is not particularly restricted as long as the laminated film is constituted by two or more layers. As such a layer structure, there may be exemplified two-layered structure formed from different two materials such as (A1)/(A2) (in this case, both of the A1 and A2 are regarded as layers), three-layered structure formed from two different materials such as (A1)/(A2)/(A1), or the like.

In the polyester film according to the present invention, at least one film layer (A1) comprises a polyester material containing virgin polyester in an amount of not less than 90% by weight, whereas at least one film layer (A2) comprises a polyester material containing reclaimed polyester obtained from the color pigment-containing polyester, in an amount of 10 to 70% by weight, and virgin polyester in an amount of 30 to 90% by weight. When the amount of the reclaimed polyester contained in the film layer (A2) is less than 10% by weight, the economic effect of reducing costs of raw materials may not be sufficiently exhibited. On the other hand, when the amount of the reclaimed polyester in the film layer (A2) is more than 70% by weight, the color tone of the film layer (A1) may be adversely affected by that of the film layer (A2). Also, for the reason concerning such a color tone, in the case where the reclaimed polyester is used in the film layer (A1), the upper limit of amount of the reclaimed polyester blended therein is usually less than 10% by weight, preferably not more than 5% by weight, more preferably not more than 3% by weight.

The thickness Tr of the film layer (A2) is preferably larger than the thickness Tv of the film layer (A1). More specifically, it is preferred that the thicknesses Tr and Tv satisfy the following formula (4):

$$Tr > Tv \geq 0.15 \, \mu m \qquad (4)$$

When Tr is smaller than Tv, since it means that the amount of the reclaimed polyester blended in the film is small, the economic effect of reducing costs of raw materials may not be sufficiently exhibited.

The thickness Tv of the film layer (A1) is preferably not less than 0.15 $\mu$m, more preferably not less than 0.2 $\mu$m, still more preferably not less than 0.5 $\mu$m. When the thickness Tv is less than 0.15 $\mu$m, the color tone of the film layer (A1) tends to be adversely affected by that of the film layer (A2).

The color difference ΔE' between the film layer (A1) and the film layer (A2) which is represented by the following formula (3), is not more than 5.0.

$$\Delta E' = \{(Lm-Ls)^2 + (am-as)^2 + (bm-bs)^2\}^{1/2} \qquad (3)$$

wherein Ls, as and bs are color tone values of the film layer (A1) in Hunter's color determination system; and Lm, am and bm are color tone values of the film layer (A2) in Hunter's color determination system.

When ΔE' is more than 5.0, even though the color tone of the film layer (A1) is kept constant, the difference in color tone between the (A1) and (A2) layers may become more remarkable at end portions of the film. Therefore, in the case where the polyester film is used at a position where its end portion is exposed to outside, there may be caused a problem concerning the color difference. The color difference ΔE' is preferably not more than 3.0, more preferably not more than 2.0. Incidentally, the above-mentioned color tone or hue (L, a, b) of the respective film layers may be measured by a color difference meter.

Meanwhile, since the decorative plates and the decorative sheets are used as a surface material, it is inevitable that these plates and sheets come into contact with tip ends of cleaners, fingernails or toenails, etc., so that the surfaces thereof sometimes become damaged. Especially when the surfaces of the decorative plates or the decorative sheets undergo severe contact, scratch or abrasion, much larger damages are caused thereon, so that a surface or an inside of a underlying film layer tends to be exposed to the surfaces of the decorative plates or the decorative sheets. In such a case, when a color tone of the film layer is different from that of a printed layer formed on the surface of the film layer, the damaged portions are remarkably contrasted with surrounding portions due to the difference in color tone therebetween, thereby causing severe damage to a design value of the surfaces of the decorative plates or the decorative sheets.

However, in accordance with the present invention, since the polyester film used can satisfy the requirements concerning ΔE', the above problem can be effectively prevented.

Wood-based materials have been favorably used for furniture, building materials, household appliances or the like. Specifically, ligneous color tones are favorably adopted in Japanese-style housings, because a space surrounded by such ligneous color tones contributes to mental rest or serenity of residents. In such a case, since the picture-printed layer (B) has a yellowish to brownish color tone, it is important to control the b value of the color tone of the film. Accordingly, in the present invention, the b value of the color tone of the film layer (A1) is adjusted to preferably not less than 10, more preferably not less than 15, still more preferably not less than 20. When the b value of the color tone of the film layer (A1) is less than 10, the film layer may be lack in yellow color tone, so that the color difference between the film layer and the picture-printed layer (B) becomes increased. As the preferred color pigments used for controlling the color tone of the polyester film, there may be exemplified iron (Fe) compounds, though not particularly restricted thereto. Especially, such a pigment called yellow iron oxide ($Fe_2O_3$) can be suitably used because of excellent thermal stability, less change in color tone upon regeneration and low cost.

Incidentally, it is preferred that the polyester film according to the second aspect satisfy the definition of the polyester film according to the first aspect.

In order to enhance the adhesion between the polyester film and the picture-printed layer, it is preferable to form a coating layer on at least one polyester film surface to be contact with the picture-printed layer (B). As coating materials for forming the coating layer, the same materials as defined in the first aspect described hereinbefore can be used. The thickness of the coating layer after drying is the same definition as described in the first aspect hereinbefore.

The picture-printed layer formed on the surface of the color pigment-containing polyester film according to the second aspect of the present invention has the same definition as described in the first aspect hereinbefore.

The above-mentioned reclaimed raw material may be produced from such film portions which are thickened due to neck-in phenomenon upon melt-extrusion of sheets during the production process of color pigment-containing polyester films or which serve as a clamping edge for clips during stretching process thereof, and trimmed or separated off from the film because these film portions are not preferable as commercial products. The trimmed or separated film portions are usually pulverized and dried, and then melt-extruded into strands using a single-screw extruder. The melt-extruded strands are cooled and solidified in water and then cut into pellets using a cutter.

Upon drying the pulverized film portions, the drying temperature is usually 100 to 200° C., preferably 130 to 190° C., more preferably 140 to 185° C. When the drying temperature is too low, the waster content of the resultant reclaimed material may not be reduced, so that when a mixture comprising the reclaimed material and a virgin material is melted and co-extruded in a film production process, there arises a problem that the molecular weight of polyester is considerably decreased by hydrolysis thereof. On the other hand, when the drying temperature is too high, the color pigments, especially organic pigments, may be sublimated so that the content of the color pigments therein is unstably varied, and change in color tone of the resultant reclaimed polyester becomes large.

The following description is common explanation to the polyester films according to the first aspect and second aspect.

The polyester film according to the present invention can be produced by the following manner. That is, first, a molten sheet melt-extruded is rapidly cooled and solidified on a rotary cooling drum, thereby forming an amorphous sheet. In the case of a laminated polyester sheet, by using a multi-manifold die or a feed block die, co-extrusion is conducted to form the laminated sheet. The amorphous sheet or laminated amorphous sheet is then stretched in one direction (longitudinal direction) at a temperature of usually 70 to 150° C., preferably 75 to 130° C. and a stretch ratio of usually 2.0 to 7.0 times, preferably 2.4 to 6 times, thereby obtaining a uniaxially stretched film. Such a stretching process may be conducted using a roll-type or tenter-type stretching machine. Then, the uniaxially stretched film is stretched in the direction perpendicular to the longitudinal direction (transverse direction) at a temperature of usually 70 to 150° C., preferably 80 to 140° C. and a stretch ratio of 3.0 to 6 times, thereby obtaining a biaxially stretched film. Successively, the obtained biaxially stretched film may be heat-treated at 110 to 250° C. under the condition of elongation or relaxation of not more than 30% or a constant length for 1 second to 5 minutes, thereby improving a thermal stability thereof.

The thickness of the polyester film according to the present invention, is usually 10 to 250 μm, preferably 12 to 200 μm, more preferably 15 to 125 μm.

A decorative sheet comprising a picture-printed layer (B) and the polyester film according to the first aspect or laminated polyester film according to the second aspect as defined in the above shows excellent properties.

As described above, in accordance with the present invention, there can be provided a polyester film for decorative sheets which can maintain a high design value even when a picture-printed surface thereof undergoes dent deformation and scratches.

Further, in accordance with the present invention, there can also be provided a color pigment-containing laminated polyester film which is suitable as a film for decorative plates or decorative sheets, can reduce costs of raw materials by using as a raw material, a mixture comprising a reclaimed material and a virgin material, and can maintain a highly stable color tone.

EXAMPLES

The present invention is described in more detail with reference to the following examples, but the present invention is not restricted to those examples and various modifications are possible within the scope of the invention.

Incidentally, in Examples and Comparative Examples, various properties are evaluated by the following methods, and "part(s)" represents "part(s) by weight", unless otherwise specified.

(1) Color Tone:

Using a color analyzer ("TC-1800MKII-Model" manufactured by Tokyo Denshoku Co., Ltd.), the three excitation value (X, Y, Z) of each film was measured according to JIS Z8722. The color tones of the respective films ($L^*$, $a^*$ and $b^*$ values or L, a and b) were determined by JIS Z8105 and compared with each other with respect to the measured $L^*$, $a^*$ and $b^*$ or L, a and b values, and the color difference $\Delta E^*$ and $\Delta E'$ were obtained according to the formulas (1) and (3) as defined hereinbefore.

(2) Intrinsic Viscosity IV (dl/g) of Polyester:

Polyester from which other polymers immiscible with polyester and particles were excluded, was dissolved in a mixed solvent comprising phenol and tetrachloroethane (weight ratio: 50:50). At this time, 100 milliliters of the mixed solvent was used based on one gram of the polyester. The IV of the obtained solution was measured at 30° C.

(3) Evaluation of Coin-Scratch Property:

The surface of a decorative sheet on which a picture-printed layer was formed, was scratched by a coin, thereby destroying the printed layer and a polyester film thereunder. The destroyed portions were observed to examine the change in color tone thereof. The results were classified into the following ranks.

◯: change in color tone was small, and injures were not noticeable

X: change in color tone is large, injures were noticeable

Δ: intermediate conditions between the above two ranks

◎: change in color tone was extremely small (4) Total evaluation:

◯: change in color tone by the above evaluation of coin-scratch property was small, and costly advantageous ◎: excellent in all of properties X: change in color tone was large, or costly disadvantageous (4) Hiding Property:

The hiding power of the film was determined by measuring an optical density of a G-filter light transmitted through the film using a MacBeth illuminometer "TD-904 Type". The larger measured value indicates the higher hiding power of the film. The results of the measurement were classified into A to C grades according to the hiding power of the film as follows.

Grade A: hiding power of more than 1.0;
Grade B: hiding power of 0.1 to 1.0;
Grade C: hiding power of less than 0.1

(5) Ink Adhesion Property:

An ink-coated film was subjected to the following peel test, and the results were classified into 5 ranks to evaluate an ink adhesion property of the film.

First, an indigo cello-color printing ink ("CCST39" produced by Toyo Ink Seizo Co., Ltd.) was applied onto a surface of a film, and then hot air-dried at 80° C. for one minute so as to form a dry coating ink layer having a thickness of 1.5 µm on the film, thereby obtaining an ink-coated film as a test film. After the obtained test film was conditioned at a temperature of 23° C. and a relative humidity of 50% for 24 hours, an adhesive tape ("Cellotape" (width: 18 mm) produced by Nichiban Co., Ltd.) having a length of 7 cm was adhered onto the ink-coated surface of the test film so as not to trap air bubbles therebetween. A constant load of 3 kg was applied onto the adhesive tape by a hand-operated loading roll. Then, the test film was fixed on an upright substrate. A weight of 500 g was connected to an upper end of the adhesive tape through a 45 cm-long thread, and allowed to drop form the same height as the upper end of the adhesive tape. After allowing the weight to drop 45 cm by gravity, the peel test was initiated by peeling the adhesive t ape in the direction of 180°.

The results of the peel test were classified into the following five ranks as follows, to evaluate an ink adhesion property of the test film.

Rank 5: no ink was peeled and transferred to the surface of the adhesive tape;

Rank 4: only less than 10% of ink was peeled and transferred to the surface of the adhesive tape;

Rank 3: 10 to 50% of ink was peeled and transferred to the surface of the adhesive tape;

Rank 2: not less than 50% of ink was peeled and transferred to the surface of the adhesive tape; and Rank 1: a whole part of ink was completely peeled and transferred to the surface of the adhesive tape.

(6) Deformability:

By using a metal mold with a truncated pyramid mold cavity having a top length of 10 cm, a top width of 10 cm, a maximum depth of 1 cm, a bottom length of 8 cm and a bottom width of 8 cm, the film was heated and then deformed within the mold cavity under vacuum and pressurized air. The results are classified into A to D grades as follows.

Grade A: the film was deformable and completely brought into close contact with a whole surface of the mold cavity;

Grade B: the film was deformable and almost completely brought into close contact with a whole surface of the mold cavity;

Grade C: the film was deformable but not brought into close contact with a whole surface of the mold cavity; and Grade D: not deformable at all.

Example 1

Using a vented twin-screw extruder, polyester (A) which comprises polyethylene telephthalate, has an intrinsic viscosity (IV) of 0.65 and contains substantially no particles, was intimately kneaded with 41% by weight of rutin-type titanium dioxide having a particle size of 0.3 µm, 18% by weight of zinc ferrite ($ZnO.Fe_2O_3$) having a particle size of 0.5 µm and 0.05% by weight of carbon black having a particle size of 0.01 µm based on the weight of the polyester (A), thereby preparing master batch pellets (B). Separately, also using a vented twin-screw extruder, the polyester (A) was intimately kneaded with 3% by weight of silica having a particle size of 3.5 µm based on the weight of the polyester (A, thereby preparing master batch pellets (C). The above zinc ferrite is the yellow pigment obtained by the calcination of the blend comprising iron oxide and zinc oxide in the amount of 1:1 by weight.

65% by weight of the polyester (A), 16% by weight of the master batch pellets (B) and 19% by weight of the master batch pellets (C) were blended together, dried at 180° C. for 2 hours and melt-extruded into a sheet using a single-screw extruder. The extruded sheet was shaped on a rotary cooling drum maintained at 30° C., thereby obtaining an amorphous sheet. At this time, the sheet was retained on the rotary cooling drum by an electrostatic pinning method. Successively, the obtained amorphous sheet was biaxially stretched at 83° C. and a stretch ratio of 2.8 times in the longitudinal direction and at 115° C. and a stretch ratio of 3.9 times in the transverse direction, and then heat-treated at a heat-setting temperature of 210° C. for 3.5 seconds, thereby obtaining a polyester film (D) having a thickness of 45 $\mu$m. The obtained polyester film (D) had a color tone expressed by L* value: 68; a* value: 9.1; and b* value: 27.2. In addition, the hiding power of the polyester film (D) was 1.7 (Grade A), and the deformability thereof was Grade B.

Next, a high design value picture-printed layer (1) comprising a solid picture-printed layer and a wood grain-like picture-printed layer, were formed on the polyester film (D), thereby obtaining a decorative sheet (E) having a wood grain-like pattern. The wood grain-like picture-printed layer showed a color tone expressed by L* value: 31.8; a* value: 8.8; and b* value: 17.7.

Then, the surface of the decorative sheet (E) was scratched by a coin to evaluate a coin-scratch property thereof. Portions of the decorative sheet where peeling-off of the wood grain-like picture-printed layer was caused, were observed sufficiently. As a result, although the underlying polyester film was exposed to the surface of the decorative sheet at some portions, a high design value of the decorative sheet was still maintained due to less color difference between the wood grain-like picture-printed layer and the polyester film.

Example 2

The polyester film (D) was produced in the same manner as in Example 1. Thereafter, a high design value picture-printed layer (2) comprising a solid picture-printed layer and a wood grain-like picture-printed layer which were slightly different in color tone, i.e., had a slightly higher concentration than that obtained in Example 1, was formed on the polyester film (D), thereby obtaining a decorative sheet (F). The wood grain-like picture-printed layer had a color tone expressed by L* value: 40.3; a* value: 11.2; and b* value: 28.7. The surface of the decorative sheet (F) was scratched by a coin to evaluate a coin-scratch property thereof. As a result, although portions where the underlying polyester film was exposed to the surface of the decorative sheet, were recognized similarly to Example 1, a high design value of the decorative sheet was still maintained due to less color difference between the wood grain-like picture-printed layer and the polyester film.

Example 3

The polyester film (D) was produced in the same manner as in Example 1. Thereafter, a high design value picture-printed layer (3) comprising a solid picture-printed layer and a wood grain-like picture-printed layer which were slightly different in color tone, i.e., had a slightly higher concentration than that obtained in Example 1, was formed on the polyester film (D), thereby obtaining a decorative sheet (G). The wood grain-like picture-printed layer had a color tone expressed by L* value: 53.4; a* value: 10.6; and b* value: 30.1. The surface of the decorative sheet (G) was scratched by a coin to evaluate a coin-scratch property thereof. As a result, although portions where the underlying polyester film was exposed to the surface of the decorative sheet, were recognized similarly to Example 1, a high design value of the decorative sheet was still maintained due to less color difference between the wood grain-like picture-printed layer and the polyester film.

Example 4

The polyester film (D) was produced in the same manner as in Example 1. Thereafter, a high design value picture-printed layer (4) comprising a solid picture-printed layer and a wood grain-like picture-printed layer which were slightly different in color tone, i.e., had a slightly higher concentration than that obtained in Example 1, was formed on the polyester film (D), thereby obtaining a decorative sheet (H). The wood grain-like picture-printed layer had a color tone expressed by L* value: 57.7; a* value: 3.0; and b* value: 11.3. The surface of the decorative sheet (H) was scratched by a coin to evaluate a coin-scratch property thereof. As a result, although portions where the underlying polyester film was exposed to the surface of the decorative sheet, were recognized similarly to Example 1, a high design value of the decorative sheet was still maintained due to less color difference between the wood grain-like picture-printed layer and the polyester film.

Example 5

The polyester film (D) was produced in the same manner as in Example 1. Thereafter, a high design value picture-printed layer (5) comprising a solid picture-printed layer and a wood grain-like picture-printed layer which were slightly different in color tone, i.e., had a slightly higher concentration than that obtained in Example 1, was formed on the polyester film (D), thereby obtaining a decorative sheet (I). The wood grain-like picture-printed layer had a color tone expressed by L* value: 57.7; a* value: 3.0; and b* value: 6.3. The surface of the decorative sheet (I) was scratched by a coin to evaluate a coin-scratch property thereof. As a result, although portions where the underlying polyester film was exposed to the surface of the decorative sheet, were recognized similarly to Example 1, a high design value of the decorative sheet was still maintained due to less color difference between the wood grain-like picture-printed layer and the polyester film.

Example 6

The same procedure as defined in Example 1 was conducted except that polyester (J) comprising a dicarboxylic acid component composed of 85 mol % of terephthalic acid units and 15 mol % of isophthalic acid units and a diol component composed of ethylene glycol, was used instead of polyester (A), thereby producing a polyester film (K). The obtained polyester film (K) had a color tone expressed by L* value of 68, a* value of 9.1 and b* value of 27.2. In addition, the hiding power of the polyester film (K) was 1.7 (Grade A), and the deformability thereof was Grade A.

Thereafter, a high design value picture-printed layer (1) composed of a solid picture-printed layer and a wood grain-like picture-printed layer was formed on the polyester film (K) in the same manner as in Example 1, thereby obtaining a decorative sheet (L). The wood grain-like picture printed layer had a color tone expressed by L* value of 31.8, a* value of 8.8 and b* value of 17.7. The surface of the decorative sheet (L) was scratched by a coin to evaluate a coin-scratch property thereof. As a result, although portions where the underlying polyester film was exposed to the surface of the decorative sheet were recognized similarly to Example 1, a high design value of the decorative sheet was still maintained due to less color difference between the wood grain-like picture-printed layer and the polyester film.

Example 7

The same procedure as defined in Example 1 was conducted except that polyester (M) comprising a dicarboxylic acid component composed of 60 mol % of terephthalic acid units and 40 mol % of isophthalic acid units and a diol component composed of ethylene glycol, was used instead of polyester (A), thereby producing a polyester film (N). However, in the above procedure, a melt-extruded raw material was vacuum-dried at 120° C. for 6 hours, and formed into a film under the following conditions. That is, the longitudinal stretching was conducted at a temperature of 70° C. and a stretch ratio of 2.8 times; the transverse stretching was conducted at a temperature of 90° C. and a stretch ratio of 3.9 times; and the thermal setting was conducted at 150° C. for 3.5 seconds. The obtained polyester film (N) had a color tone expressed by $L^*$ value of 68, $a^*$ value of 9.1 and $b^*$ value of 27.2. In addition, the hiding power of the polyester film (N) was 1.7 (Grade A), and the deformability thereof was Grade A.

Thereafter, a high design value picture-printed layer (1) composed of a solid picture-printed layer and a wood grain-like picture-printed layer was formed on the polyester film (N) in the same manner as in Example 1, thereby obtaining a decorative sheet (O). The wood grain-like picture printed layer had a color tone expressed by $L^*$ value of 31.8, $a^*$ value of 8.8 and $b^*$ value of 17.7. Since the obtained decorative sheet (O) was deteriorated in thermal stability, defects in surface flatness such as blisters or wrinkles were caused upon formation of the wood grain-like picture-printed layer, so that it was difficult to print the decorative sheet (O). The surface of the decorative sheet (O) was scratched by a coin to evaluate a coin-scratch property thereof. As a result, although portions where the underlying polyester film was exposed to the surface of the decorative sheet were recognized similarly to Example 1, a high design value of the decorative sheet was still maintained due to less color difference between the wood grain-like picture-printed layer and the polyester film.

Example 8

A polyester film (P) on which a coating layer was formed, was produced in the following manner.

(1) A water dispersion of polyester resin, a water dispersion of polyurethane resin, hexamethoxy methyl melamine and a water dispersion of silicon oxide were mixed together in amounts of 20 wt %, 65 wt %, 10 wt % and 5 wt %, respectively, based on dry solid contents thereof, and the mixture was diluted with water, thereby preparing a coating solution.

(2) Using a bar coater, the above-prepared coating solution was applied onto the polyester film (D) so as to form a coating layer having a thickness of 0.1 $\mu$m when dried, thereby obtaining the polyester film (P). The obtained polyester film (P) had a color tone expressed by $L^*$ value of 68.5, $a^*$ value of 9.2 and $b^*$ value of 28.2. In addition, the hiding power of the polyester film (P) was 1.7 (Grade A), and the deformability thereof was Grade B.

Thereafter, a high design value picture-printed layer (1) composed of a solid picture-printed layer and a wood grain-like picture-printed layer was formed on the coating layer of the polyester film (P) in the same manner as in Example 1, thereby obtaining a decorative sheet (Q). The wood grain-like picture printed layer had a color tone expressed by $L^*$ value of 31.8, $a^*$ value of 8.8 and $b^*$ value of 17.7. The surface of the decorative sheet (Q) was scratched by a coin to evaluate a coin-scratch property thereof. As a result, although portions where the underlying polyester film was exposed to the surface of the decorative sheet were recognized similarly to Example 1, a high design value of the decorative sheet was still maintained due to less color difference between the wood grain-like picture-printed layer and the polyester film. Further, a high adhesion between the polyester film and ink was maintained, so that exposed portions of the polyester film were advantageously reduced.

Example 9

Using a bar coater, the coating solution obtained in Example 8 was applied onto the same polyester film (K) as used in Example 6 so as to form a coating layer having a thickness of 0.1 $\mu$m when dried, thereby obtaining a polyester film (R). The obtained polyester film (R) had a color tone expressed by $L^*$ value of 68.5, $a^*$ value of 9.2 and $b^*$ value of 28.2. In addition, the hiding power of the polyester film (R) was 1.7 (Grade A), and the deformability thereof was Grade A.

Thereafter, a high design value picture-printed layer (1) composed of a solid picture-printed layer and a wood grain-like picture-printed layer was formed on the coating layer of the polyester film (R) in the same manner as in Example 1, thereby obtaining a decorative sheet (S). The wood grain-like picture printed layer had a color tone expressed by $L^*$ value of 31.8, $a^*$ value of 8.8 and $b^*$ value of 17.7. The surface of the decorative sheet (S) was scratched by a coin to evaluate a coin-scratch property thereof. As a result, although portions where the underlying polyester film was exposed to the surface of the decorative sheet were recognized similarly to Example 1, a high design value of the decorative sheet was still maintained due to less color difference between the wood grain-like picture-printed layer and the polyester film. Further, a high adhesion between the polyester film and ink was maintained, so that exposed portions of the polyester film were advantageously reduced.

Comparative Example 1

Using a vented twin-screw extruder, polyester (A) having an intrinsic viscosity (IV) of 0.65 and containing substantially no particles was intimately kneaded with 41% by weight of rutin-type titanium dioxide having a particle size of 0.3 $\mu$m based on the weight of the polyester (A), thereby preparing master batch pellets (T). Separately, also using a vented twin-screw extruder, the polyester (A) was intimately kneaded with 3% by weight of silica having a particle size of 3.5 $\mu$m, thereby preparing master batch pellets (C).

65% by weight of the polyester (A), 16% by weight of the master batch pellets (T) and 19% by weight of the master batch pellets (C) were blended together, dried at 180° C. for 2 hours and then melt-extruded into a sheet using a single-screw extruder. The extruded sheet was shaped on a rotary cooling drum maintained at 30° C., thereby obtaining an amorphous sheet. At this time, the extruded sheet was retained on the rotary cooling drum by an electrostatic pinning method. Successively, the obtained amorphous sheet was biaxially stretched at 83° C. and a stretch ratio of 2.8 times in the longitudinal direction and at 115° C. and a stretch ratio of 3.9 times in the transverse direction, and then heat-treated at a heat-setting temperature of 210° C. for 3.5 seconds, thereby obtaining a polyester film (U) having a thickness of 45 μm. The obtained polyester film (U) had a color tone expressed by L* value: 91; a* value: 0.8; and b* value: −4. In addition, the hiding power of the polyester film (U) was 0.3 (Grade B), and the deformability thereof was Grade B.

Next, a high design value picture-printed layer (1) comprising the same solid picture-printed layer and wood grain-like picture-printed layer as obtained in Example 1, was formed on the polyester film (U), thereby obtaining a decorative sheet (V). The wood grain-like picture-printed layer had a color tone expressed by L* value: 32; a* value: 9.0; and b* value: 17.0. Then, the surface of the decorative sheet (V) was scratched by a coin to evaluate a coin-scratch property thereof. As a result, portions where the underlying polyester film was exposed to the surface of the decorative sheet, were remarkably noticed due to large color difference between the wood grain-like picture-printed layer and the polyester film, thereby damaging a design value of the decorative sheet.

Comparative Example 2

The polyester film (U) was produced in the same manner as in Comparative Example 1. Thereafter, a high design value picture-printed layer (2) comprising a solid picture-printed layer and a wood grain-like picture-printed layer was formed on the polyester film (U), thereby obtaining a decorative sheet (W). The wood grain-like picture-printed layer had a color tone expressed by L* value: 42.1; a* value: 11.1; and b* value: 29.1. The surface of the decorative sheet (W) was scratched by a coin to evaluate a coin-scratch property thereof. As a result, portions where the underlying polyester film was exposed to the surface of the decorative sheet, were remarkably noticed due to large color difference between the wood grain-like picture-printed layer and the polyester film, thereby damaging a design value of the decorative sheet.

Comparative Example 3

The polyester film (U) was produced in the same manner as in Comparative Example 1. Thereafter, a high design value picture-printed layer (3) comprising a solid picture-printed layer and a wood grain-like picture-printed layer was formed on the polyester film (U), thereby obtaining a decorative sheet (X). The wood grain-like picture-printed layer had a color tone expressed by L* value: 54.0; a* value: 11.0; and b* value: 32.0. The surface of the decorative sheet (X) was scratched by a coin to evaluate a coin-scratch property thereof. As a result, portions where the underlying polyester film was exposed to the surface of the decorative sheet, were remarkably noticed due to large color difference between the wood grain-like picture-printed layer and the polyester film, thereby damaging a design value of the decorative sheet.

| | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|
| ΔE* | 37 | 28 | 15 | 20 | 24 | 37 | 37 | 38 | 38 | 63 | 60 | 53 |
| Δb* | 9.5 | 1.5 | 2.9 | 15.9 | 20.9 | 9.5 | 9.5 | 10.5 | 10.5 | 21.0 | 32.9 | 36.0 |
| Coin-scratch property | ◎ | ◎ | ◎ | ◎ | ○ | ◎ | ◎ | ◎ | ◎ | X | X | X |
| Hiding property | Grade A | Grade A | Grade A | Grade A | Grade A | Grade A | Grade A | Grade A | Grade A | Grade B | Grade B | Grade B |
| Deformability | Grade B | Grade B | Grade B | Grade B | Grade B | Grade A | Grade A | Grade B | Grade A | Grade B | Grade B | Grade B |
| Ink adhesion property | 3 | 3 | 3 | 3 | 3 | 3 | 3 | 3 | 3 | 3 | 3 | 3 |
| Total evaluation | ○ | ○ | ○ | ○ | ○ | ◎ | ◎ | ◎ | ◎ | X | X | X |

Example 10

66% by weight of polyethylene terephthalate (PET) (A), 16% by weight of the master batch pellets (B) and 18% by weight of the master batch pellets (C) were blended together, dried at 180° C. for 2 hours and then melt-extruded into a sheet using a single-screw extruder. The extruded sheet was shaped on a rotary cooling drum maintained at 30° C., thereby obtaining an amorphous sheet. At this time, the extruded sheet was retained on the rotary cooling drum by an electrostatic pinning method. Successively, the obtained amorphous sheet was biaxially stretched at 83° C. and a stretch ratio of 2.8 times in the longitudinal direction and at 115° C. and a stretch ratio of 3.9 times in the transverse direction, and then heat-treated at a heat-setting temperature of 210° C. for 3.5 seconds, thereby obtaining a color pigment-containing PET film (D').

Next, the PET film (D') was pulverized and then passed through a 6 mmΦ screen to obtain fluffs. The thus obtained fluffs were dried at 180° C. for 2 hours, and then melt-extruded into strands using a single-screw extruder. The strands were cooled in water and cut by a pelletizer, thereby obtaining reclaimed PET chips (E').

Using a multi-manifold die for forming a two-layered film comprising two different materials, two PET raw materials respectively having the following compositions were melt-extruded into a sheet. Thereafter, the sheet was biaxially stretched and then heat-treated in the same manner as above, thereby obtaining a color pigment-containing laminated PET film (F'). The composition of raw material of one layer (A1) was 66% by weight of PET (A); 16% by weight of the master batch pellets (B); and 18% by weight of the master batch pellets (C), whereas the composition of raw material of the other layer (A2) was 40% by weight of the reclaimed PET chips (E'); 40% by weight of virgin PET (A); 10% by weight of the master batch pellets (B); and 10% by weight of the master batch pellets (C). The resultant laminated film (F') had a thickness of 45 μm, and the thickness of the layer (A1) was 4 μm and the thickness of the layer (A2) was 41 μm. The properties of the obtained color pigment-containing laminated film (F') are shown in Table 2. It was determined that costs of raw materials were low, and as a result of evaluation of coin-scratch property, the obtained laminated film showed less change in color tone between respective portions thereof.

Example 11

Using a vented twin-screw extruder, PET (A) having an intrinsic viscosity (IV) of 0.65 and containing substantially no particles was intimately kneaded with 60% by weight of rutin-type titanium dioxide having a particle size of 0.3 μm, 1.9% by weight of iron oxide ($Fe_2O_3$), 3.7% by weight of anthraquinone and 0.1% by weight of carbon black based on the weight of the PET (A), thereby preparing master batch pellets (G').

After 66% by weight of the PET (A), 16% by weight of the master batch pellets (G') and 18% by weight of the master batch pellets (C) were blended together, the same procedure as defined in Example 10 was conducted to obtain a color pigment-containing PET film (H'). Then, the obtained film (H') was treated in the same manner as in Example 10, thereby obtaining reclaimed PET chips (I').

Next, using a multi-manifold die, two PET raw materials were melt-extruded into a sheet having two layers comprising different two materials. Thereafter, the sheet was biaxially stretched and then heat-treated in the same manner as defined in Example 10, thereby obtaining a color pigment-containing laminated PET film (J'). The composition of raw material of one layer (A1) was 66% by weight of the PET (A); 16% by weight of the master batch pellets (G'); and 18% by weight of the master batch pellets (C), whereas the composition of raw material of the other layer (A2) was 60% by weight of the reclaimed PET chips (I'); 26% by weight of virgin PET (A); 7% by weight of the master batch pellets (G'); and 7% by weight of the master batch pellets (C). The resultant laminated film (J') had a thickness of 45 μm, and the thickness of the layer (A1) was 4 μm and the thickness of the layer (A2) was 41 μm. The properties of the color pigment-containing laminated film (J') are shown in Table 2. It was determined that costs of raw materials were low, and as a result of evaluation of coin-scratch property, the obtained laminated film showed less change in color tone between respective portions thereof.

Comparative Example 4

The same procedure as defined in Example 11 was conducted except that the composition of raw material of the layer (A2) was changed to 90% by weight of the reclaimed PET chips (I'); 7% by weight of virgin PET (A); 2% by weight of the master batch pellets (B); and 1% by weight of the master batch pellets (C), thereby obtaining a color pigment-containing laminated PET film (K'). The properties of the film (K') are shown in Table 2. It was determined that costs of raw materials were low, but as a result of evaluation of coin-scratch property, the obtained laminated film showed a large color difference between opposite surfaces thereof and a large change in appearance thereof.

Example 12

The same procedure as defined in Example 10 was conducted except that using a multi-manifold die for forming a three-layered film comprising different two materials, respective PET materials were melt-extruded into a sheet having a layer structure of (A1)/(A2)/(A1), thereby obtaining a color pigment-containing laminated PET film (L'). The thickness of each of the two layers (A1) was 4 μm, and the thickness of the intermediate layer (A2) was 37 μm. The properties of the film (L') are shown in Table 2. It was determined that costs of raw materials were low, and as a result of evaluation of coin-scratch property, the obtained laminated film showed less change in color tone between respective portions thereof.

TABLE 2

|  | Example 10 | Example 11 | Comp. Example 4 | Example 12 |
| --- | --- | --- | --- | --- |
| Amount of reclaimed PET based on total PET (wt %) | 30 | 30 | 75 | 60 |
| Costs of raw materials | Low | Low | Low | Low |
| Color difference ΔE' | 3.1 | 0.5 | 5.2 | 0.6 |
| b value | 20 | 25 | 30 | 22 |
| Total evaluation | ○~◎ | ◎ | X | ○ |

What is claimed is:

1. A polyester film for a decorative sheet wherein said sheet comprises a picture-printed layer (B) and said polyester film (A) laminated on a substrate, said polyester film containing a color pigment in an amount of 0.1 to 30 weight % based on the weight of said polyester (A), and said polyester film having a color tone which satisfies the color difference ΔE* between said polyester film (A) and the picture-printed layer (B), which is represented by the following formula (1), of not more than 40.

$$\Delta E^* = \{(L^*A - L^*B)^2 + (a^*A - a^*B)^2 + (b^*A - b^*B)^2\}^{1/2} \quad (1)$$

wherein L*A, a*A and b*A represent color tone values of the polyester film (A) in CIELAB color determination system; and L*B, a*B and b*B represent color tone values of the picture-printed layer (B) in CIELAB color determination system.

2. A polyester film according to claim 1, wherein the b* value difference between the polyester film (A) and the picture-printed layer (B) satisfies the following formula (2).

$$|b^*A - b^*B| \leq 20 \quad (2)$$

wherein b*A represents the b* value of the polyester film (A); and b*B represents the b* value of the picture-printed layer (B).

3. A polyester film according to claim 1, wherein the color tone value of L*A is 20 to 80, the color tone value of a*A is not less than −10, and the color tone value of b*A is not less than −5.

4. A polyester film according to claim 1, wherein the color pigment is a yellow color pigment comprising iron oxide and zinc oxide.

5. A polyester film according to claim 1, which further comprises a coating layer laminated on at least one polyester film surface to be contacted with the picture-printed layer (B), the coating layer comprising at least one compound selected from the group consisting of polyester resins, acrylic resins, polyurethane resins, amino resins, epoxy resins, oxazoline resins and coupling agents.

6. A polyester film according to claim 1, wherein said polyester film is a copolyester film containing at least isophthalic acid units in the amount of 5 to 30 mol % based on the total dicarboxylic acid unit.

7. A polyester film for a decorative sheet wherein said sheet comprises a picture-printed layer (B) and said polyester film laminated on a substrate, wherein said polyester film comprises at least one film layer (A1) and at least one film layer (A2) and is produced by a co-extrusion method, said at least one film layer (A1) and said at least one film layer (A2) satisfying the following requirements (i) and (ii):
(i) said at least one film layer (A1) comprising polyester containing virgin polyester in an amount of not less than 90% by weight, whereas said at least one film layer (A2) comprising 10 to 70% by weight of reclaimed polyester obtained from a color pigment-containing polyester and 30 to 90% by weight of virgin polyester; and
(ii) the color difference ΔE' between said at least one film layer (A1) and said at least one film layer (A2), which is represented by the following formula (3), being not more than 5.0.

$$\Delta E' = \{(Lm-Ls)^2 + (am-as)^2 + (bm-bs)^2\}^{1/2} \quad (3)$$

wherein Ls, as and bs represent color tone values of the film layer (A1) in Hunter's color determination system; and Lm, am and bm represent color tone values of the film layer (A2) in Hunter's color determination system.

8. A polyester film according to claim 7, wherein the thickness Tr of said film layer (A2) and the thickness Tv of said film layer (A1) satisfy the following formula (4):

$$Tr > Tv \geq 0.15 \, \mu m \quad (4)$$

9. A polyester film according to claim 7, wherein the color difference ΔE' represented by the formula (3) is not more than 3.0.

10. A polyester film according to claim 7, wherein the b value of said film layer (A1) is not less than 10.

11. A polyester film according to claim 7, comprising at least an Fe compound as a color pigment.

* * * * *